· US011214650B2

(12) United States Patent
Namiki et al.

(10) Patent No.: US 11,214,650 B2
(45) Date of Patent: Jan. 4, 2022

(54) COMPOSITION FOR HIGH REFRACTIVE INDEX LOW DISPERSION RESINS FOR COMPOSITE DIFFRACTIVE OPTICAL ELEMENTS, AND COMPOSITE DIFFRACTIVE OPTICAL ELEMENT USING THE SAME

(71) Applicant: MITSUBISHI GAS CHEMICAL COMPANY, INC., Tokyo (JP)

(72) Inventors: Kousuke Namiki, Tokyo (JP); Eiji Koshiishi, Tokyo (JP); Kikuo Furukawa, Osaka (JP); Hiroshi Horikoshi, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 645 days.

(21) Appl. No.: 16/091,314

(22) PCT Filed: Apr. 6, 2017

(86) PCT No.: PCT/JP2017/014302
§ 371 (c)(1),
(2) Date: Oct. 4, 2018

(87) PCT Pub. No.: WO2017/179476
PCT Pub. Date: Oct. 19, 2017

(65) Prior Publication Data
US 2019/0127530 A1 May 2, 2019

(30) Foreign Application Priority Data

Apr. 11, 2016 (JP) .............................. JP2016-079016

(51) Int. Cl.
*C08G 75/045* (2016.01)
*G02B 5/18* (2006.01)
*G02B 1/04* (2006.01)

(52) U.S. Cl.
CPC ............. *C08G 75/045* (2013.01); *G02B 1/04* (2013.01); *G02B 5/18* (2013.01); *G02B 5/1828* (2013.01)

(58) Field of Classification Search
CPC ................ G02B 27/42; G02B 27/0037; G02B 27/4205; G02B 27/4211; G02B 27/0944; G02B 5/18; G02B 5/1895; G02B 27/0927; G02B 27/1086; G02B 27/0025; G02B 27/0075; G02B 2/4233; G02B 3/00; G02B 3/0081; G02B 5/1809; G02B 5/1814; G02B 5/1828; G02B 5/32; G02B 27/0905; G02B 27/425; G02B 27/4272; G02B 5/1819; G02B 19/0014; G02B 19/0028; G02B 19/0042; G02B 1/041; G02B 27/0056; G02B 27/0081; G02B 27/1006; G02B 27/4244; G02B 27/4261; G02B 27/4277; G02B 27/4294; G02B 3/08; G02B 5/1852; G02B 5/1866; G02B 6/0035; G02B 13/18; G02B 15/00; G02B 15/173; G02B 19/0004; G02B 19/0019; G02B 1/11; G02B 21/0032; G02B 21/02; G02B 21/367; G02B 23/14; G02B 23/243; G02B 26/02; G02B 27/106; G02B 27/28; G02B 27/4222; G02B 27/44; G02B 3/0006; G02B 3/0012; G02B 3/0056; G02B 3/12; G02B 5/02; G02B 5/1847; G02B 5/1861; G02B 5/1876; G02B 5/3025; G02B 6/0038; G02B 6/005; G02B 6/0058; G02B 6/3518; G02B 6/4206;

(Continued)

(56) References Cited

U.S. PATENT DOCUMENTS

| 5,908,876 A | 6/1999 | Fujii et al. |
| 7,553,544 B2 | 6/2009 | Nakamura et al. |
| 7,923,116 B2 | 4/2011 | Nakamura et al. |
| 8,367,872 B2 | 2/2013 | Miyakawa et al. |
| 2005/0014088 A1 | 1/2005 | Nakamura et al. |
| 2006/0052547 A1 | 3/2006 | Jethmalani et al. |
| 2006/0171031 A1 | 8/2006 | Suzuki |

(Continued)

FOREIGN PATENT DOCUMENTS

| AU | 709040 B2 | 8/1999 |
| EP | 598551 A2 | 5/1994 |

(Continued)

OTHER PUBLICATIONS

European Search Report issued with respect to Application No. 17782292.1, dated Mar. 21, 2019.

(Continued)

*Primary Examiner* — Collin X Beatty
*Assistant Examiner* — Grant A Gagnon
(74) *Attorney, Agent, or Firm* — Greenblum & Bernstein, P.L.C.

(57) ABSTRACT

A composition for a high refractive index, low dispersion resin for a close-contact double layer-type composite diffractive optical element that is highly photocurable and provides a high productivity, and a close-contact double layer-type composite diffractive optical element using such composition are provided. A composition for a high refractive index, low dispersion resin for a close-contact double layer-type composite diffractive optical element includes a thiol compound represented by general formula (1) or an oligomer synthesized by use of a thiol compound represented by general formula (1) (A component); and an ene compound including two or more polymerizable unsaturated bonds (B component). (In the formula, p represents an integer of 2 to 5; $X_p$ and $Z_p$ independently represent a hydrogen atom or a mercaptomethyl group; a ratio of sulfur atoms in a molecule is 40 to 80% by mass; and the number of thiol groups is 3 or larger.).

13 Claims, No Drawings

(58) Field of Classification Search
CPC ........ G02B 6/4214; G02B 7/008; G02B 9/34; G02B 13/004; G02B 13/0045; G02B 13/005; G02B 13/0055; G02B 13/0085; G02B 13/009; G02B 13/04; G02B 13/146; G02B 15/14; G02B 15/144109; G02B 15/144113; G02B 15/145109; G02B 15/1461; G02B 15/16; G02B 15/17; G02B 15/20; G02B 19/0047; G02B 19/0057; G02B 19/0066; G02B 19/0071; G02B 19/009; G02B 1/002; G02B 1/04; G02B 1/115; G02B 2006/12102; G02B 2006/12107; G02B 2027/0125; G02B 21/002; G02B 21/0084; G02B 21/10; G02B 21/16; G02B 2207/101; G02B 23/2438; G02B 23/2446; G02B 25/004; G02B 26/0833; G02B 26/10; G02B 27/00; G02B 27/0006; G02B 27/0012; G02B 27/0101; G02B 27/0172; G02B 27/095; G02B 27/0961; G02B 27/0977; G02B 27/0983; G02B 27/0988; G02B 27/1013; G02B 27/104; G02B 27/1093; G02B 27/123; G02B 27/143; G02B 27/16; G02B 27/283; G02B 27/4216; G02B 27/4238; G02B 27/4266; G02B 27/46; G02B 27/58; G02B 30/25; G02B 30/36; G02B 3/0043; G02B 3/005; G02B 3/0062; G02B 3/04; G02B 3/14; G02B 5/005; G02B 5/021; G02B 5/0215; G02B 5/06; G02B 5/1857; G02B 5/1885; G02B 5/30; G02B 5/3016; G02B 6/0015; G02B 6/0018; G02B 6/0036; G02B 6/006; G02B 6/29314; G02B 6/3512; G02B 6/3516; G02B 6/3534; G02B 6/3546; G02B 6/3556; G02B 6/356; G02B 6/4224; G02B 6/4231; G02B 6/4232; G02B 6/4238; G02B 6/4239; G02B 6/4246; G02B 7/025; G02B 7/28; G02B 9/12; G02B 9/62

USPC ........................................................ 359/558

See application file for complete search history.

(56) References Cited

U.S. PATENT DOCUMENTS

2008/0107903 A1  5/2008  Miyakawa et al.
2010/0060986 A1  3/2010  Nakamura et al.

FOREIGN PATENT DOCUMENTS

| JP | H07-26089 A | 1/1995 |
| JP | H10-114825 A | 5/1998 |
| JP | 2005-107298 A | 4/2005 |
| JP | 2008-512524 A | 4/2008 |
| JP | 4238729 B2 | 3/2009 |
| JP | 4872671 B2 | 2/2012 |
| JP | 2012-233045 A | 11/2012 |
| JP | 2012-233114 A | 11/2012 |
| WO | 2006/068138 A | 6/2006 |
| WO | 2012/147708 A | 11/2012 |
| WO | 2012/147711 A | 11/2012 |
| WO | 2013/047079 A | 4/2013 |

OTHER PUBLICATIONS

International search Report issued for Patent Application No. PCT/JP2017/014302, dated May 30, 2017.

International preliminary Report on patentability issued for Patent Application No. PCT/JP2017/014302, dated Oct. 16, 2018.

COMPOSITION FOR HIGH REFRACTIVE INDEX LOW DISPERSION RESINS FOR COMPOSITE DIFFRACTIVE OPTICAL ELEMENTS, AND COMPOSITE DIFFRACTIVE OPTICAL ELEMENT USING THE SAME

TECHNICAL FIELD

The present invention relates to a composition for a high refractive index and low dispersion resin that is preferably usable for a composite optical element including a plurality of resin material layers stacked in a close contact state and having a diffraction structure at a joint surface thereof, and also relates to a composite diffractive optical element using such a composition, for example, a close-contact double layer-type composite diffractive optical element.

BACKGROUND ART

A composite optical element that includes a low refractive index and high wavelength dispersion resin and a high refractive index and low wavelength dispersion resin closely contacting each other and has a diffraction structure at a joint surface thereof (hereinafter, such a composite optical element will be referred to as a "close-contact double layer-type composite diffractive optical element") is known and is highly useful for an imaging optical system. A diffraction structure formed of a resin is mainly provided at an adhesive interface of a joint-type glass tablet lens, and is used to, for example, correct color aberration (Patent Document 1).

In general, it is preferred that two resins have a large refractive index difference because in such a case, the height of the diffraction structure may be made low, and the influence of a fluctuation in the refractive index of each of the resins exerted on the diffraction efficiency is decreased. However, as the refractive index of a resin material is higher, the wavelength dispersion thereof (hereinafter, referred to simply as "dispersion") tends to be larger. Therefore, effective combinations of a low refractive index and high dispersion resin and a high refractive index and low dispersion resin are limited.

Resin materials for a close-contact double layer-type composite diffractive optical element are roughly classified into a material having inorganic microparticles dispersed therein and a material formed only of an organic material. The material having inorganic microparticles dispersed therein is difficult to be cured while the uniformity of the light transmittance or the refractive index is maintained. Therefore, the material formed only of an organic material is higher in productivity.

Most of high refractive index and low dispersion components formed only of an organic component use a polymerizable sulfur compound. In general, a component having a higher content of sulfur has a higher refractive index and thus is preferable as a high refractive index and low dispersion material for a close-contact double layer-type composite diffractive optical element.

For example, an episulfide resin is used in Patent Document 1, a thiourethane resin is used in Patent Document 2, and a sulfur-containing acrylic resin is used in Patent Document 3, as a high refractive index and low dispersion material. However, the episulfide resin or the thiourethane resin have a problem of being inferior in productivity because a photo base/acid generator usable to cure, by light, the episulfide resin or the thiourethane resin has a low start efficiency and thus an initiator vulnerable to a polymerization inhibition needs to be used to cure the episulfide resin or the thiourethane resin by light. The sulfur-containing acrylic resin has a problem of being low in content of sulfur and thus having inferior characteristics as a high refractive index and low dispersion material.

CITATION LIST

Patent Literature

Patent Document 1: WO2013/047079
Patent Document 2: Japanese Patent No. 4238729
Patent Document 3: Japanese Patent No. 4872671

SUMMARY OF INVENTION

Technical Problem

The present invention has an object of providing a composition for a high refractive index and low dispersion resin for a close-contact double layer-type composite diffractive optical element that is highly photocurable and provides a high productivity, and a close-contact double layer-type composite diffractive optical element using such a composition.

Solution to Problem

As a result of performing studies in order to achieve the above-described object, the present inventors have found that a composition for a high refractive index and low dispersion resin containing a tri- or higher-functional polythiol having a specific structure and a bi- or higher-functional ene compound has an optical characteristic preferable for a high refractive index and low dispersion material for a composite diffractive optical element, especially, for a close-contact double layer-type composite diffractive optical element, and is also highly photocurable. The present invention is as follows.

[1] A composition for a high refractive index and low dispersion resin for a close-contact double layer-type composite diffractive optical element, the composition comprising:

a thiol compound represented by general formula (1) or an oligomer synthesized by use of a thiol compound represented by general formula (1) (A component); and an ene compound including two or more polymerizable unsaturated bonds (B component):

[Chemical formula 1]

(where p represents an integer of 2 to 5; $X_p$ and $Z_p$ independently represent a hydrogen atom, a mercapto group, or a mercaptomethyl group; a ratio of sulfur atoms in a molecule is 40 to 80% by mass; and the number of thiol groups is 3 or larger.)

[2] The composition for a high refractive index and low dispersion resin according to [1], wherein the thiol compound represented by general formula (1) is at least one selected from the group consisting of 4-mercaptomethyl-1,8-dimercapto-3,6-dithiaoctane (4-mercaptomethyl-3,6- dithia-1,8-octanedithiol), 4,8-bis(mercaptomethyl)-1,11-dimercapto-3,6,9-trithiaundecane (4,8-dimercaptomethyl-1,11-dimercapto-3,6,9-trithiaundecane), 4,7-bis(mercaptomethyl)-1,11-dimercapto-3,6,9-trithiaundecane (4,7-dimercaptomethyl-1,11-dimercapto-3,6,9-trithiaundecane), and 5,7-bis(mercaptomethyl)-1,11-dimercapto-3,6,9-trithiaundecane (5,7-dimercaptomethyl-1,11-dimercapto-3,6,9-trithiaundecane).

[3] The composition for a high refractive index and low dispersion resin according [1] or [2], wherein the component A is an oligomer synthesized by use of the thiol compound represented by general formula (1).

[4] The composition for a high refractive index and low dispersion resin according to any one of [1] through [3], wherein the component B is a non-aromatic ene compound.

[5] The composition for a high refractive index and low dispersion resin according to any one of [1] through [4], wherein the composition includes the component A at a ratio of 30% by mass or higher.

[6] The composition for a high refractive index and low dispersion resin according to any one of [1] through [5], wherein the composition has a viscosity at 23° C. in the range of 500 to 20000 mPa·s.

[7] The composition for a high refractive index and low dispersion resin according to any one of [1] through [6], wherein the component A contains an oligomer in which a part of a thiol group in the thiol compound represented by general formula (1) is bonded with an isocyanate compound.

[8] The composition for a high refractive index and low dispersion resin according to any one of [1] through [7], wherein the composition has an Abbe number in the range of 30 to 50.

[9] A high refractive index and low dispersion resin obtained by curing the composition for a high refractive index and low dispersion resin according to any one of [1] through [8].

[10] A close-contact double layer-type composite diffractive optical element, comprising:
the high refractive index and low dispersion resin according to [9]; and a low refractive index and high dispersion resin having a refractive index lower than that of, and exhibiting a dispersibility higher than that of, the high refractive index and low dispersion resin.

[11] The close-contact double layer-type composite diffractive optical element according to [10], wherein the high refractive index and low dispersion resin and the low refractive index and high dispersion resin have a refractive index difference at an e line of 0.02 to 0.1; have a refractive index difference at an F line that is 0.8 to 0.98 times the refractive index difference at the e line; and have a refractive index difference at a C line that is 1.02 to 1.26 times the refractive index difference at the e line.

Advantageous Effects of Invention

According to the present invention, a close-contact double layer-type composite diffractive optical element, formed of a resin, having a high diffraction efficiency in a wide wavelength range and also having characteristics required for a refractive lens such as high moldability, low birefringence and the like is provided with a high productivity.

DESCRIPTION OF EMBODIMENTS

A composition for a high refractive index and low dispersion resin according to the present invention includes a thiol compound or an oligomer synthesized by use of a thiol compound (A component); and an ene compound including two or more polymerizable unsaturated bonds (B component).

[Thiol Compound or Oligomer Synthesized by Use of the Thiol Compound (A Component)]

The thiol compound usable for the present invention is represented by the following general formula (1).

[Chemical formula 2]

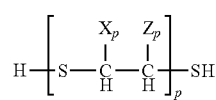

(1)

(where p represents an integer of 2 to 5; $X_p$ and $Z_p$ independently represent a hydrogen atom, a mercapto group, or a mercaptomethyl group; a ratio of sulfur atoms in a molecule is 40 to 80% by mass; and the number of thiol groups is 3 or larger).

From the point of view of characteristics of high refractive index and low dispersion, this compound has a ratio of sulfur atoms in a molecule of 40 to 80% by mass, and preferably 50 to 70% by mass. From the point of view of maintaining the shape of the close-contact double layer-type composite diffractive optical element, the number of thiol groups in one molecule of the thiol compound is 3 or larger. In the case where the number of the thiol groups is 2 or smaller, the obtained cured product tends to be brittle.

In the above formula, p is preferably 2 to 3, and more preferably 2. $X_p$ and $Z_p$ are each preferably a hydrogen atom or a mercaptomethyl group.

Preferable specific examples of the thiol compound include 4-mercaptomethyl-1,8-dimercapto-3,6-dithiaoctane (4-mercaptomethyl-3,6-dithia-1,8-octanedithiol), 4,8-bis(mercaptomethyl)-1,11-dimercapto-3,6,9-trithiaundecane (4,8-dimercaptomethyl-1,11-dimercapto-3,6,9-trithiaundecane), 4,7-bis(mercaptomethyl)-1,11-dimercapto-3,6,9-trithiaundecane (4,7-dimercaptomethyl-1,11-dimercapto-3,6,9-trithiaundecane), and 5,7-bis(mercaptomethyl)-1,11-dimercapto-3,6,9-trithiaundecane (5,7-dimercaptomethyl-1,11-dimercapto-3,6,9-trithiaundecane).

The oligomer synthesized by use of the thiol compound is usable to increase the viscosity of the high refractive index and low dispersion resin, and is obtained by oligomerizing the thiol compound represented by general formula (1) in accordance with a known technique.

Examples of the known technique include a technique of oxidizing a part of the thiol group to realize a disulfide bond (Japanese Laid-Open Patent Publication No. 2012-233113), a technique of reacting a part of the thiol group with an ene compound, and a technique of realizing a thiourethane bond of a part of the thiol group and an isocyanate compound (WO2012/147709). An example of the ene compound to be reacted with a part of the thiol group may be an ene compound as the B component described below in detail.

Examples of the isocyanate compound include aliphatic/alicyclic bifunctional isocyanates such as isophoronediisocyanate, hexamethylenediisocyanate, bis(isocyanatomethyl)cyclohexane, norbornenediisocyanate, hydrogenated diphenylmethanediisocyanate, and the like; and aromatic bifunctional isocyanates such as tolylenediisocyanate, diphenylmethanediisocyanate, xylylenediisocyanate, and the like. In order not to spoil the characteristics of high refractive index and low dispersion, a non-aromatic isocyanate is preferable.

The ratio of the component A in the composition for the high refractive index and low dispersion resin is preferably 30 to 80% by mass, and more preferably 35 to 70% by mass. In the case where the ratio of the component A is lower than 30% by mass, the content of sulfur in the resin is too low, and thus the characteristics of high refractive index and low dispersion are not sufficiently obtained.

[Ene Compound (B Component)]

The (B) ene compound usable for the present invention includes two or more polymerizable unsaturated bonds. Any of general allyl compounds, vinyl compounds, acrylic compounds, methacrylic compounds and the like each including two or more polymerizable unsaturated bonds may be used as the B component.

In order to improve the characteristics of high refractive index and low dispersion, an ene compound not having an aromatic ring is preferable. Specific examples of such a preferable ene compound include allyl compounds such as triallyl isocyanurate, triallyl cyanurate, tetraallyloxyethane, hydrogenated triallyl trimellitate, and the like; and (meth) acrylic compounds such as oligoethyleneglycoldi(meth) acrylate, dimethyloltricyclodecanedi(meth)acrylate, trimethylolpropanetri(meth)acrylate, pentaerythritoltetra(meth) acrylate, dipentaerythritolhexa(meth)acrylate, 2,2'-thiodiethanethioldi(meth)acrylate, and the like. From the point of view of improving the refractive index, triallyl isocyanurate and triallyl cyanurate are especially preferable. These compounds may be used independently or in a mixture of two or more.

In the case where a monofunctional ene compound is used, the obtained resin is brittle, and thus it is difficult to maintain the shape of the close-contact double layer-type composite diffractive optical element.

The ratio of the B component in the composition for the high refractive index and low dispersion resin is preferably 20 to 70% by mass, and more preferably 30 to 65% by mass.

(Other Components)

The composition for the high refractive index and low dispersion resin may contain a component other than the A component and the B component described above. For example, in order to be cured, the composition for the high refractive index and low dispersion resin preferably includes a polymerization initiator, for example, a photoinitiator such as 2,2-methoxy-1,2-diphenylethane-1-one, 1-hydroxycyclohexyl-phenylketone, or the like; or a thermal polymerization initiator such as di-t-butylperoxide or the like. Optionally, the composition may include a polymerization inhibitor, an antioxidant, a photostabilizer (HALS), an ultraviolet absorber, a silane coupling agent, a releasing agent, a pigment, a dye or the like. The ratio of the other components, namely, the components other than the component A and the component B, in the composition for the high refractive index and low dispersion resin is preferably 20% by mass or lower, and more preferably 10% by mass or lower.

It is preferred that the composition for the high refractive index and low dispersion resin does not contain an inorganic component as a component other than the component A and the component B. It is preferred that the composition for the high refractive index and low dispersion resin does not contain an inorganic component, for example, inorganic microparticles. A reason for this is that in the case where inorganic microparticles are dispersed in the composition for the high refractive index and low dispersion resin, it is difficult to cure the composition while the uniformity of the light transmittance or the refractive index is maintained.

[Composition for the High Refractive Index and Low Dispersion Resin]

The composition for the high refractive index and low dispersion resin is a resin composition, a resin obtained from which has a high refractive index and a low wavelength dispersibility.

The refractive index of a resin obtained from the composition, namely, a resin generated by curing the above-described composition, is preferably 1.55 to 1.80, more preferably 1.58 to 1.70, and especially preferably 1.59 to 1.63.

The Abbe number of such a resin is preferably 30 to 50, and more preferably 35 to 45. In the case where the Abbe number is in such a range, the performance of the close-contact double layer-type composite diffractive optical element is improved. The Abbe number is a value usable as an index of wavelength dispersibility. As the Abbe number is smaller, the wavelength dispersibility is higher.

$$\text{Abbe number } (vd)=(nd-1)/(nF-nC)$$

(nd, nF, and nC are respectively refractive indexes at wavelengths of 588 nm, 486 nm and 656 nm.)

The composition for the high refractive index and low dispersion resin is obtained by homogeneously mixing the components. The post-mixture composition may be optionally filtrated or defoamed.

Regarding the ratio between the (A) thiol compound or oligomer and the (B) ene compound, the ratio of the number of the thiol groups in the thiol compound or oligomer with respect to the number of unsaturated bonds in the ene compound is preferably in the range of 0.5 to 1.5 eq., and more preferably in the range of 0.8 to 1.2 eq. In the case where the thiol equivalent is in such a range, the obtained resin has superb characteristics of high refractive index and low dispersion, and also exhibits superb properties from the point of view of the strength of the resin and the low odor.

The viscosity of the composition of the high refractive index and low dispersion resin is, at 23° C., preferably in the range of 10 to 20,000 mPa·. The viscosity may be increased by a known method of, for example, oligomerizing the thiol compound represented by general formula (1) above or incorporating a highly viscous component, so that the workability of producing the close-contact double layer-type composite diffractive optical element is improved. Such an increased viscosity is, at 23° C., preferably in the range of 500 to 20,000 mPa·s, and more preferably in the range of 1,000 to 10,000 mPa·s. In the case where the viscosity is too low, it easily occurs liquid dripping, a cissing problem, or too high fluidity of the liquid. In the case where the viscosity is too high, it is difficult to eject the composition.

In the case where the thiol compound represented by general formula (1) above that is not oligomerized is used as the A component, the viscosity of the composition for the high refractive index and low dispersion resin is preferably 20 to 2,000 mPa·s, and more preferably 30 to 1,000 mPa·s.

There is no specific limitation on the method for curing the composition for the high refractive index and low dispersion resin. The composition may be cured by any method appropriately selected.

[Composition for the Low Refractive Index and High Dispersion Resin]

The composition for the low refractive index and high dispersion resin usable for the present invention is a composition, a resin (low refractive index and high dispersion resin) obtained from which by curing has a refractive index lower than that of, and exhibiting a wavelength dispersibility higher than that of, the high refractive index and low dispersion resin.

The refractive index of such a resin is preferably 1.50 to 1.78, and more preferably 1.54 to 1.68.

The Abbe number of such a resin is preferably 10 to 40, and more preferably 20 to 35. In the case where the Abbe number is in such a range, the performance of the close-contact double layer-type composite diffractive optical element is improved.

The high refractive index and low dispersion resin according to the present invention may be used in combination with the low refractive index and high dispersion resin to act as a close-contact double layer-type composite diffractive optical element.

There is no specific limitation on the low refractive index and high dispersion resin. Any known commercially available resin is usable.

Specific examples of such a resin include thermoplastic resins obtained by polycarbonating or polyesterizing: (meth) acrylic compounds such as (oligo)ethoxylated bisphenol A di(meth)acrylate, (oligo)propoxylated bisphenol A di(meth) acrylate, (oligo)ethoxylated o-phenylphenol(meth)acrylate, 9,9-bis(4-(2-(meth)acryloxyethoxy)phenyl)fluorene, bis-2-(meth)acryloyloxyethylphthalic acid, and the like; allyl compounds such as diallyl phthalate, diallyl 2,3-naphthalenecarboxylate, diallyl 2,6-naphthalenecarboxylate, diallyl diphenate, and the like; and aromatic diol compounds such as bisphenol A, 9,9-bis(4-(2-hydroxyethoxy)phenyl)fluorene, 9,9-bis(4-hydroxy-3-phenylphenyl)fluorene, and the like. In order to increase the diffraction efficiency of the close-contact double layer-type composite diffractive optical element, the low refractive index and high dispersion resin includes an aromatic ring at preferably 25% by mass or higher, and more preferably 40% by mass or higher. These compounds may be used independently or in a mixture of two or more.

The low refractive index and high dispersion resin may optionally contain a high wavelength dispersion material such ITO microparticles, ATO polyesterized and or like, a polymerization initiator, a polymerization inhibitor, an antioxidant, a photostabilizer (HALS), an ultraviolet absorber, a silane coupling agent, a releasing agent, a pigment, a dye, or the like. The post-mixture composition may be optionally filtrated or defoamed.

[Close-Contact Double Layer-Type Composite Diffractive Optical Element]

The close-contact double layer-type composite diffractive optical element according to the present invention is a combination of a high refractive index and low dispersion resin and a low refractive index and high dispersion resin, and may be produced by a known technique.

For example, Patent Document 1 describes the following technique. A diffraction structure is transferred to one surface of a refractive lens with one of two materials, and then a gap between the diffraction structure and another refractive lens is filled with the other material, which is curable. This curable material is cured to produce a close-contact double layer-type composite diffractive optical element.

Namely, the composite diffractive optical element may be produced by stacking a layer of a high refractive index and low dispersion resin and a layer of a low refractive index and high dispersion resin on each other. The close-contact double layer-type composite diffractive optical element according to the present invention is produced by putting a layer of a high refractive index and low dispersion resin, and a layer of a low refractive index and high dispersion resin, into contact with each other with no gap. As can be seen, the close-contact double layer-type composite diffractive optical element according to the present invention may be produced with no use of an optical adhesive.

In the close-contact double layer-type composite diffractive optical element according to the present invention, the high refractive index and low dispersion resin obtained as a result of curing the composition for the high refractive index and low dispersion resin, and the low refractive index and high dispersion resin, have a refractive index difference at the e line in the range of 0.02 to 0.1; have a refractive index difference at the F line that is in the range of 0.80 to 0.98 times (preferably 0.88 to 0.98 times) the refractive index difference at the e line; and have a refractive index difference at the C line that is in the range of 1.02 to 1.26 times (preferably 1.02 to 1.12 times) the refractive index difference at the e line. In the case where the refractive index difference is in such a range, the resultant close-contact double layer-type composite diffractive optical element has good characteristics. In the case where the refractive index difference at the e line is smaller than 0.02, the diffraction grating is too high, which has an adverse influence on the characteristics of the close-contact double layer-type composite diffractive optical element such that, for example, light obliquely incident is easily pulled out as zeroth-order light. In the case where the refractive index difference is larger than 0.1, the diffraction grating is too low and the permissible tolerance during the production is small, which may cause a problem to the productivity.

In the case where the refractive index difference at the F line or the C line is not in the above-described range, the ratio of diffracted light of unnecessary orders is too high, which has an adverse influence on the characteristics of the close-contact double layer-type composite diffractive optical element such that, for example, flare is caused too much.

EXAMPLES

Hereinafter, the present invention will be described more specifically by way of examples. The following embodiment may be appropriately changed as long as the effect of the present invention is provided.

The compounds used in the examples were obtained from below. Pentaerythritoltetrakis(3-thiopropionate) (product name: PETP): Yodo Kagaku Co., Ltd. Triallylisocyanurate (product name: TAICROS): Evonik Japan K.K. Pentaerythritoltetraacrylate (product name: A-TMMT): Shin-Nakamura Chemical Co., Ltd.
Ethoxylated bisphenol A diacrylate (product name: A-BPE-2): Shin-Nakamura Chemical Co., Ltd.
9,9-bis(4-(2-acryloxyethoxy)phenyl)fluorene (product name: A-BPEF): Shin-Nakamura Chemical Co., Ltd.
Tricyclodecanedimethanoldiacrylate (product name: A-DCP): Shin-Nakamura Chemical Co., Ltd.
Isophoronediisocyanate (IPDI): Sumika Covestro Urethane Co., Ltd.
1,6-hexamethylenediisocyanate (HDI): Sumika Covestro Urethane Co., Ltd.
1,3-bis(isocyanatomethyl)cyclohexane: Tokyo Chemical Industry Co., Ltd.
Bis(β-epithiopropyl)sulfide: Mitsubishi Gas Chemical Co., Inc.
1-hydroxycyclohexyl-phenylketone (product name: IrgaCure 184): BASF Japan K.K.
Tetrabutylammonium=butyltri(1-naphthyl)borate: Showa Denko K.K.

4-benzoyl-4'-methyldiphenylsulfide (product name: Lunacure BMS): DKSH Japan t-butylperoxy-2-ethylhexanoate (product name: Perbutyl O): NOF Corporation di-t-butylperoxide (product name: Perbutyl D): NOF Corporation 4-mercaptomethyl-3,6-dithia-1,8-octanedithiol: synthesized in accordance with Japanese Patent No. 3048929

Mixture of 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane (hereinafter, referred to as "DDT"): synthesized by a method described in Japanese Patent No. 3444682

[Evaluation Method]

As a mold to transfer the diffraction structure, a nickel mold having a blaze structure having a pitch of 0.5 mm was used.

As a light source to expose the curable composition, a UV-LED light illumination device (LHPUV 365/2501, illuminance: 30 mV/cm$^2$, produced by Iwasaki Electric Co., Ltd.) was used.

[Refractive Index (ne) and Abbe Number (vd)]

The refractive index (ne) and the Abbe number (vd) of the resin were measured by use of a precision refractive index meter KPR-2000 (produced by Shimadzu Device Corporation) after a pre-curing composition was held between two slide glasses (S9213 produced by Matsunami Glass Ind. Ltd.) to have a thickness of 250 μm and cured, and then was cut perpendicularly and polished. The temperature at the measurement was 25° C.

[Viscosity]

For measuring the viscosity, a cone plate-type viscometer HADV-11+Pro (produced by Brookfield) was used. The temperature at the measurement was 23° C.

[Photocurability]

The photocurability was evaluated as follows. During the production of a close-contact double layer-type composite diffractive optical element, the composition for the high refractive index and low dispersion resin was irradiated with an LED lamp of a wavelength of 365 nm and an illuminance of 30 mW/cm$^2$ for 1 minute. A composition that was cured with no tuck at the surface was evaluated as being good. A composition that was not cured was evaluated as being poor.

[Diffraction Characteristics]

Based on the refractive index difference of the resins used, the height of diffraction grating was set such that the diffracted light of unnecessary orders in the wavelength range of 400 nm to 700 nm would be minimized. The diffraction characteristics of the close-contact double layer-type composite diffractive optical element was evaluated by the minimum diffraction efficiency in this wavelength range. A minimum diffraction efficiency of 90% or higher was evaluated as being good, and a minimum diffraction efficiency of lower than 90% was evaluated as being poor.

[Birefringence]

The birefringence was evaluated by light leak observed by use of polarization plates located in a crossed Nicols state. In the case where no obvious light leak was observed, the birefringence was evaluated as being good. In the case where light leak was observed, the birefringence was evaluated as being poor.

Example 1

Preparation of a Composition for a High Refractive Index and Low Dispersion Resin 52 parts by mass of 4-mercaptomethyl-3,6-dithia-1,8-octanedithiol (a-1) as the component A, 48 parts by mass of triallyl isocyanurate (b-1) as the B component, and 1 part by mass of 1-hydroxycyclohexyl-phenylketone (i-1) as the polymerization initiator were mixed until becoming homogeneous to prepare a composition for a high refractive index and low dispersion resin.

Preparation of a Composition for a Low Refractive Index and High Dispersion Resin 47 parts by mass of ethoxylated bisphenol A diacrylate (b-3) and 53 parts by mass of 9,9-bis(4-(2-acryloxyethoxy)phenyl)fluorene (b-4) were stirred to be mixed at 80° C., and 1 part by mass of t-butylperoxy-2-ethylhexanoate (i-2) was mixed thereto, to prepare a composition for a low refractive index and high dispersion resin.

Production of a Close-Contact Double Layer-Type Composite Diffractive Optical Element The above-described composition for the low refractive index and high dispersion resin was injected into a mold including, at one of two surfaces thereof, a nickel mold having a diffraction structure and, at the other surface, an optical glass plate (N-BK7: produced by SCHOTT), with a spacer having a thickness of 100 μm being located between the nickel mold and the optical glass plate. The composition for the low refractive index and high dispersion resin was heated at 80° C. for 24 hours to be cured. The nickel mold was removed to obtain a glass-resin close-contact double layer-type composite diffractive optical element having the diffraction structure transferred to the low refractive index and high dispersion resin.

The obtained glass-resin close-contact double layer-type composite diffractive optical element and a glass mold were located to face each other, such that the surface having the diffraction structure of the optical element would face the glass mold, and a spacer having a thickness of 100 μm was located between the optical element and the glass mold. The composition for the high refractive index and low dispersion resin was injected to the assembly of the optical element and the glass mold, and was irradiated with an LED lamp of a wavelength of 365 nm and an illuminance of 30 mW/cm$^2$ for 1 minute, to be cured. The photocurability of the composition for the high refractive index and low dispersion resin, and the diffraction characteristics and the low birefringence of the obtained close-contact double layer-type composite diffractive optical element, were good.

Example 2

Preparation of a Composition for a High Refractive Index and Low Dispersion Resin 50 parts by mass of 4-mercaptomethyl-3,6-dithia-1,8-octanedithiol (a-1), 50 parts by mass of pentaerythritoltetraacrylate (b-2), and 1 part by mass of 1-hydroxycyclohexyl-phenylketone (i-1) were mixed until becoming homogeneous to prepare a composition for a high refractive index and low dispersion resin.

Preparation of a Composition for a Low Refractive Index and High Dispersion Resin 89 parts by mass of ethoxylated bisphenol A diacrylate (b-3) and 11 parts by mass of 9,9-bis(4-(2-acryloxyethoxy)phenyl)fluorene (b-4) were stirred to be mixed at 80° C., and 1 part by mass of t-butylperoxy-2-ethylhexanoate (i-2) was mixed thereto, to prepare a composition for a low refractive index and high dispersion resin.

Production of a Close-Contact Double Layer-Type Composite Diffractive Optical Element A close-contact double layer-type composite diffractive optical element was produced in substantially the same manner as in example 1 by use of the composition for the high refractive index and low dispersion resin and the composition for the low refractive index and high dispersion resin described above. The photocurability of the composition for the high refractive index and low dispersion resin, and the diffraction characteristics and the low birefringence of the obtained close-contact double layer-type composite diffractive optical element, were good.

Example 3

Preparation of a Composition for a High Refractive Index and Low Dispersion Resin)

38 parts by mass of 4-mercaptomethyl-3,6-dithia-1,8-octanedithiol (a-1), 62 parts by mass of tricyclodecanedimethanoldiacrylate (b-5), and 1 part by mass of 1-hydroxycyclohexyl-phenylketone (i-1) were mixed until becoming homogeneous to prepare a composition for a high refractive index and low dispersion resin.

Preparation of a Composition for a Low Refractive Index and High Dispersion Resin 73 parts by mass of ethoxylated bisphenol A diacrylate (b-3) and 27 parts by mass of tricyclodecanedimethanoldiacrylate (b-5) were stirred to be mixed at 80° C., and 1 part by mass of t-butylperoxy-2-ethylhexanoate (i-2) was mixed thereto, to prepare a composition for a low refractive index and high dispersion resin.

Production of a Close-Contact Double Layer-Type Composite Diffractive Optical Element A close-contact double layer-type composite diffractive optical element was produced in substantially the same manner as in example 1 by use of the composition for the high refractive index and low dispersion resin and the composition for the low refractive index and high dispersion resin described above. The photocurability of the composition for the high refractive index and low dispersion resin, and the diffraction characteristics and the low birefringence of the obtained close-contact double layer-type composite diffractive optical element, were good.

Example 4

Preparation of a Composition for a High Refractive Index and Low Dispersion Resin 53 parts by mass of DDT (a-2), 47 parts by mass of triallyl isocyanurate (b-1), and 1 part by mass of 1-hydroxycyclohexyl-phenylketone (i-1) were mixed until becoming homogeneous to prepare a composition for a high refractive index and low dispersion resin.

Preparation of a Composition for Low Refractive Index and High Dispersion Resin 39 parts by mass of ethoxylated bisphenol A diacrylate (b-3) and 61 parts by mass of 9,9-bis(4-(2-acryloxyethoxy) phenyl)fluorene (b-4) were stirred to be mixed at 80° C., and 1 part by mass of t-butylperoxy-2-ethylhexanoate (i-2) was mixed thereto, to prepare a composition for a low refractive index and high dispersion resin.

Production of a Close-Contact Double Layer-Type Composite Diffractive Optical Element A close-contact double layer-type composite diffractive optical element was produced in substantially the same manner as in example 1 by use of the composition for the high refractive index and low dispersion resin and the composition for the low refractive index and high dispersion resin described above. The photocurability of the composition for the high refractive index and low dispersion resin, and the diffraction characteristics and the low birefringence of the obtained close-contact double layer-type composite diffractive optical element, were good.

Example 5

Preparation of a Composition for a High Refractive Index and Low Dispersion Resin 54 parts by mass of 4-mercaptomethyl-3,6-dithia-1,8-octanedithiol (a-1), 46 parts by mass of pentaerythritoltetraacrylate (b-2), and 1 part by mass of 1-hydroxycyclohexyl-phenylketone (i-1) were mixed until becoming homogeneous to prepare a composition for a high refractive index and low dispersion resin.

Production of a Close-Contact Double Layer-Type Composite Diffractive Optical Element Bisphenol A-type polycarbonate (product name: Iupilon H-4000 produced by Mitsubishi Engineering-Plastics Corporation; b-9) was put into a mold having a diffraction structure and was compression-molded at 300° C. to obtain an optical element having the diffraction structure transferred thereto. A close-contact double layer-type composite diffractive optical element was produced in substantially the same manner as in example 1 by use of the obtained optical element and the composition for the high refractive index and low dispersion resin described above. The photocurability of the composition for the high refractive index and low dispersion resin, and the diffraction characteristics and the low birefringence of the obtained close-contact double layer-type composite diffractive optical element, were good.

Example 6

Preparation of a Composition for a High Refractive Index and Low Dispersion Resin A mixed solution of 52 parts by mass of 4-mercaptomethyl-3,6-dithia-1,8-octanedithiol (a-1), 48 parts by mass of triallyl isocyanurate (b-1), and 0.1 parts by mass of di-t-butylperoxide (i-3) was heated at 100° C. for 72 hours to be oligomerized. Then, 1 part by mass of 1-hydroxycyclohexyl-phenylketone (i-1) was mixed thereto until a homogeneous mixture was obtained, and the resultant mixture was filtrated to prepare a composition for a high refractive index and low dispersion resin.

Substantially the same operation as in example 1 was performed except for the above. The photocurability of the composition for the high refractive index and low dispersion resin, and the diffraction characteristics and the low birefringence of the obtained close-contact double layer-type composite diffractive optical element, were good. The composition for the high refractive index and low dispersion resin had a viscosity suitable for the work, and no liquid dripped during the production of the optical element.

Example 7

The composition for the high refractive index and low dispersion resin and the composition for the low refractive index and high dispersion resin were prepared in substantially the same manner as in example 6 except that 1 part by mass of 1-hydroxycylohexyl-phenylketone (i-1) was used as the polymerization initiator for the composition of the low refractive index and high dispersion resin. The resultant composition for the high refractive index and low dispersion resin was injected into a mold including, at one of two surfaces thereof, a nickel mold having a diffraction structure and, at the other surface, an optical glass plate (N-BK7), with a spacer having a thickness of 100 µm being located between the nickel mold and the optical glass plate. The composition for the high refractive index and low dispersion resin was irradiated with an LED lamp of a wavelength of 365 nm and an illuminance of 30 mW/cm² for 1 minute to be cured. The nickel mold was removed to obtain a glass-resin close-contact double layer-type composite diffractive optical element having the diffraction structure transferred to the high refractive index and low dispersion resin.

The resultant glass-resin close-contact double layer-type composite diffractive optical element and a glass mold were located to face each other, such that the surface having the diffraction structure of the optical element would face the glass mold, and a spacer having a thickness of 100 µm was located between the optical element and the glass mold. The composition for the low refractive index and high dispersion resin described above was injected to the assembly of the optical element and the glass mold, and was irradiated with an LED lamp of a wavelength of 365 nm and an illuminance of 30 mW/cm² for 1 minute, to be cured. The photocurability of the composition for the high refractive index and low dispersion resin, and the diffraction characteristics and the low birefringence of the obtained close-contact double layer-type composite diffractive optical element, were good. The composition for the high refractive index and low dispersion resin had a viscosity suitable for the work, and no liquid dripped during the production of the optical element.

Example 8

Preparation of a Composition for a High Refractive Index and Low Dispersion Resin 51 parts by mass of 4-mercaptomethyl-3,6-dithia-1,8-octanedithiol (a-1), 13 parts by mass of isophoronediisocyanate (b-6), and 0.02 parts by mass of (+)-10-camphorsulfonic acid were stirred to be mixed, and the resultant mixture was heated at 100° C. for 72 hours to obtain a thiololigomer. 36 parts by mass of triallyl isocyanurate (b-1) and 1 part by mass of 1-hydroxycyclohexyl-phenylketone (i-1) were mixed thereto until a homogenous mixture was obtained to prepare a composition for a high refractive index and low dispersion resin.

Preparation of a Composition for a Low Refractive Index and High Dispersion Resin 54 parts by mass of ethoxylated bisphenol A diacrylate (b-3) and 46 parts by mass of 9,9-bis(4-(2-acryloxyethoxy) phenyl)fluorene (b-4) were stirred to be mixed at 80° C., and 1 part by mass of t-butylperoxy-2-ethylhexanoate (i-2) was mixed thereto, to prepare a composition for a low refractive index and high dispersion resin.

Production of a Close-Contact Double Layer-Type Composite Diffractive Optical Element A close-contact double layer-type composite diffractive optical element was produced in substantially the same manner as in example 1 by use of the composition for the high refractive index and low dispersion resin and the composition for the low refractive index and high dispersion resin described above. The photocurability of the composition for the high refractive index and low dispersion resin, and the diffraction characteristics and the low birefringence of the obtained close-contact double layer-type composite diffractive optical element, were good. The composition for the high refractive index and low dispersion resin had a viscosity suitable for the work, and no liquid dripped during the production of the optical element.

Example 9

Preparation of a Composition for a High Refractive Index and Low Dispersion Resin 53 parts by mass of 4-mercaptomethyl-3,6-dithia-1,8-octanedithiol (a-1), 13 parts by mass of 1,6-hexamethylene-diisocyanate (b-7), and 0.02 parts by mass of (+)-10-camphorsulfonic acid were stirred to be mixed, and the resultant mixture was heated at 100° C. for 72 hours to obtain a thiololigomer. 34 parts by mass of triallyl isocyanurate (b-1) and 1 part by mass of 1-hydroxycyclohexyl-phenylketone (i-1) were mixed thereto until a homogenous mixture was obtained to prepare a composition for a high refractive index and low dispersion resin.

Preparation of a Composition for a Low Refractive Index and High Dispersion Resin 56 parts by mass of ethoxylated bisphenol A diacrylate (b-3) and 44 parts by mass of 9,9-bis(4-(2-acryloxyethoxy) phenyl)fluorene (b-4) were stirred to be mixed at 80° C., and 1 part by mass of t-butylperoxy-2-ethylhexanoate (i-2) was mixed thereto, to prepare a composition for a low refractive index and high dispersion resin.

Production of a Close-Contact Double Layer-Type Composite Diffractive Optical Element A close-contact double layer-type composite diffractive optical element was produced in substantially the same manner as in example 1 by use of the composition for the high refractive index and low dispersion resin and the composition for the low refractive index and high dispersion resin described above. The photocurability of the composition for the high refractive index and low dispersion resin, and the diffraction characteristics and the low birefringence of the obtained close-contact double layer-type composite diffractive optical element, were good. The composition for the high refractive index and low dispersion resin had a viscosity suitable for the work, and no liquid dripped during the production of the optical element.

Example 10

Preparation of a Composition for a High Refractive Index and Low Dispersion Resin 53 parts by mass of 4-mercaptomethyl-3,6-dithia-1,8-octanedithiol (a-1), 13 parts by mass of 1,3-bis(isocyanatomethyl)cyclohexane (b-8), and 0.02 parts by mass of (+)-10-camphorsulfonic acid were stirred to be mixed, and the resultant mixture was heated at 100° C. for 72 hours to obtain a thiololigomer. 34 parts by mass of triallyl isocyanurate (b-1) and 1 part by mass of 1-hydroxycyclohexyl-phenylketone (i-1) were mixed thereto until a homogenous mixture was obtained to prepare a composition for a high refractive index and low dispersion resin.

Preparation of a Composition for a Low Refractive Index and High Dispersion Resin 55 parts by mass of ethoxylated bisphenol A diacrylate (b-3) and 45 parts by mass of 9,9-bis(4-(2-acryloxyethoxy)phenyl)fluorene (b-4) were stirred to be mixed at 80° C., and 1 part by mass of t-butylperoxy-2-ethylhexanoate (i-2) was mixed thereto, to prepare a composition for a low refractive index and high dispersion resin.

Production of a Close-Contact Double Layer-Type Composite Diffractive Optical Element A close-contact double layer-type composite diffractive optical element was produced in substantially the same manner as in example 1 by use of the composition for the high refractive index and low dispersion resin and the composition for the low refractive index and high dispersion resin described above. The photocurability of the composition for the high refractive index and low dispersion resin, and the diffraction characteristics and the low birefringence of the obtained close-contact double layer-type composite diffractive optical element, were good. The composition for the high refractive index and low dispersion resin had a viscosity suitable for the work, and no liquid dripped during the production of the optical element.

Example 11

Preparation of a Composition for a High Refractive Index and Low Dispersion Resin 50 parts by mass of 4-mercaptomethyl-3,6-dithia-1,8-octanedithiol (a-1), 12 parts by mass of isophoronediisocyanate (b-6), and 0.02 parts by mass of (+)-10-camphorsulfonic acid were stirred to be mixed, and the resultant mixture was heated at 100° C. for 72 hours to obtain a thiololigomer. 38 parts by mass of pentaerythritoltetraacrylate (b-2) and 1 part by mass of 1-hydroxycyclohexyl-phenylketone (i-1) were mixed thereto until a homogenous mixture was obtained to prepare a composition for a high refractive index and low dispersion resin.

Preparation of a Composition for a Low Refractive Index and High Dispersion Resin 84 parts by mass of ethoxylated bisphenol A diacrylate (b-3) and 16 parts by mass of 9,9-bis(4-(2-acryloxyethoxy)phenyl)fluorene (b-4) were stirred to be mixed at 80° C., and 1 part by mass of t-butylperoxy-2-ethylhexanoate (i-2) was mixed thereto, to prepare a composition for a low refractive index and high dispersion resin.

Production of a Close-Contact Double Layer-Type Composite Diffractive Optical Element A close-contact double layer-type composite diffractive optical element was produced in substantially the same manner as in example 1 by use of the composition for the high refractive index and low dispersion resin and the composition for the low refractive index and high dispersion resin described above. The photocurability of the composition for the high refractive index and low dispersion resin, and the diffraction characteristics and the low birefringence of the obtained close-contact double layer-type composite diffractive optical element, were good. The composition for the high refractive index and low dispersion resin had a viscosity suitable for the work, and no liquid dripped during the production of the optical element.

Comparative Example 1

Preparation of a Composition for a High Refractive Index and Low Dispersion Resin 60 parts by mass of pentaerythritoltetrakisthiopropionate (a-3), 40 parts by mass of triallyl isocyanurate (b-1), and 1 part by mass of 1-hydroxycyclohexyl-phenylketone (i-1) were mixed until becoming homogenous to prepare a composition for a high refractive index and low dispersion resin.

Preparation of a Composition for a Low Refractive Index and High Dispersion Resin 60 parts by mass of ethoxylated bisphenol A diacrylate (b-3) and 40 parts by mass of tricyclodecanedimethanoldiacrylate (b-5) were stirred to be mixed at 80° C., and 1 part by mass of t-butylperoxy-2-ethylhexanoate (i-2) was mixed thereto, to prepare a composition for a low refractive index and high dispersion resin.

Production of a Close-Contact Double Layer-Type Composite Diffractive Optical Element A close-contact double layer-type composite diffractive optical element was produced in substantially the same manner as in example 1 by use of the composition for the high refractive index and low dispersion resin and the composition for the low refractive index and high dispersion resin described above. The photocurability of the composition for the high refractive index and low dispersion resin, and the low birefringence of the obtained close-contact double layer-type composite diffractive optical element, were good. However, the refractive index difference between the resins was as small as 0.01, and was not suitable for the resins for the close-contact double layer-type composite diffractive optical element.

Comparative Example 2

Preparation of a Composition for a High Refractive Index and Low Dispersion Resin A composition for a high refractive index and low dispersion resin was prepared in substantially the same manner as in comparative example 1.

Preparation of a Composition for a Low Refractive Index and High Dispersion Resin 36 parts by mass of ethoxylated bisphenol A diacrylate (b-3) and 64 parts by mass of tricyclodecanedimethanoldiacrylate (b-5) were stirred to be mixed at 80° C., and 1 part by mass of t-butylperoxy-2-ethylhexanoate (i-2) was mixed thereto, to prepare a composition for a low refractive index and high dispersion resin.

Production of a Close-Contact Double Layer-Type Composite Diffractive Optical Element A close-contact double layer-type composite diffractive optical element was produced in substantially the same manner as in example 1 by use of the composition for the high refractive index and low dispersion resin and the composition for the low refractive index and high dispersion resin described above. The photocurability of the composition for the high refractive index and low dispersion resin, and the refractive index difference between the resins, were good. However, the diffraction characteristics were poor.

Comparative Example 3

Preparation of a Composition for a High Refractive Index and Low Dispersion Resin 30 parts by mass of pentaerythritoltetrakisthiopropionate (a-3), 70 parts by mass of bis(β-epithiopropyl)sulfide (a-4), 1 part by mass of tetrabutylammonium=butyltri(1-naphthyl)borate (i-4), and 1 part by mass of 4-benzoyl-4'-methyldiphenylsulfide (i-5) were mixed to prepare a curable composition from which a high refractive index and low dispersion resin was to be prepared.

Preparation of a Composition for a Low Refractive Index and High Dispersion Resin)

100 parts by mass of acrylic mixture mainly containing 9,9-bis(4-(2-acryloxyethoxy)phenyl)fluorene (product name: EA-HR033; produced by Osaka Gas Chemicals Co., Ltd.; b-10) and 1 part by mass of t-butylperoxy-2-ethylhexanoate (i-2) were mixed to prepare a composition for a low refractive index and high dispersion resin.

Production of a Close-Contact Double Layer-Type Composite Diffractive Optical Element It was attempted to produce a close-contact double layer-type composite diffractive optical element in substantially the same manner as in example 1 by use of the composition for the high refractive index and low dispersion resin and the composition for the low refractive index and high dispersion resin described above. The composition for the high refractive index and low dispersion resin was still liquid after being irradiated with an LED lamp of a wavelength of 365 nm and an illuminance of 30 mW/cm² for 1 minute, and the photocurability was poor. When being irradiated with the light for another 9 minutes, the composition for the high refractive index and low dispersion resin was cured. The diffraction characteristics and the low birefringence of the obtained close-contact double layer-type composite diffractive optical element were good.

TABLE 1

| | | | EX. 1 | EX. 2 | EX. 3 | EX. 4 | EX. 5 |
|---|---|---|---|---|---|---|---|
| HIGH REFRACTIVE INDEX AND LOW DISPERSION RESIN | THIOL COMPOUND | COMPOUND | a-1 | a-1 | a-1 | a-2 | a-1 |
| | | PARTS BY MASS | 52 | 50 | 38 | 53 | 54 |
| | ISOCYANATE COMPOUND | COMPOUND | | | | | |
| | | PARTS BY MASS | | | | | |
| | ene COMPOUND | COMPOUND | b-1 | b-2 | b-5 | b-1 | b-2 |
| | | PARTS BY MASS | 48 | 50 | 62 | 47 | 46 |
| | POST-CURING REFRACTIVE INDEX ne | | 1.628 | 1.601 | 1.583 | 1.632 | 1.608 |
| | ABBE NUMBER vd | | 39 | 42 | 47 | 39 | 42 |
| | VISCOSITY OF COMPOSITION (PRE-CURING)/mPa·s | | 60 | 120 | 50 | 200 | 120 |
| | PHOTOCURABILITY | | GOOD | GOOD | GOOD | GOOD | GOOD |
| | SH/ene RATIO | | 1 | 1 | 1 | 1 | 1.2 |
| LOW REFRACTIVE INDEX AND HIGH DISPERSION RESIN | POLYMERIZABLE AROMATIC COMPOUND | COMPOUND | b-3 | b-3 | b-3 | b-3 | |
| | | PARTS BY MASS | 47 | 89 | 73 | 39 | |
| | REFRACTIVE INDEX ADJUSTING COMPONENT | COMPOUND | b-4 | b-4 | b-5 | b-4 | b-9 |
| | | PARTS BY MASS | 53 | 11 | 27 | 61 | 100 |
| | POLYMERIZATION INITIATOR | COMPOUND | i-2 | i-2 | i-2 | i-2 | |
| | | PARTS BY MASS | 1 | 1 | 1 | 1 | |
| | REFRACTIVE INDEX ne | | 1.601 | 1.581 | 1.563 | 1.605 | 1.586 |
| | ABBE NUMBER vd | | 30 | 33 | 30 | 29 | 30 |
| REFRACTIVE INDEX DIFFERENCE | Δne | | 0.027 | 0.02 | 0.02 | 0.027 | 0.022 |
| | ΔnF/Δne | | 0.92 | 0.92 | 0.94 | 0.92 | 0.91 |
| | ΔnC/Δne | | 1.08 | 1.08 | 1.07 | 1.08 | 1.09 |
| HEIGHT OF DIFFRACTION GRATING/μm | | | 21.6 | 28.3 | 28.7 | 21.6 | 26.7 |
| DIFFRACTION EFFICIENCY | | | 97 | 97 | 96 | 97 | 98 |
| DIFFRACTION EFFICIENCY GOOD/POOR | | | GOOD | GOOD | GOOD | GOOD | GOOD |
| BIREFRINGENCE | | | GOOD | GOOD | GOOD | GOOD | GOOD | a-1: 4-mercaptomethyl-3,6-dithia-1,8-octanedithiol
a-2: DDT (mixture of 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane)
b-1: triallyl isocyanurate
b-2: pentaerythritoltetraacrylate
b-3: ethoxylated bisphenol A diacrylate
b-4: 9,9-bis(4-(2-acryloxyethoxy)phenyl)fluorene
b-5: tricyclodecanedimethanoldiacrylate
b-9: Iupilon H-4000
i-2: t-butylperoxy-2-ethylhexanoate
i-3: di-t-butylperoxide

TABLE 2

|  |  |  | EX. 6 | EX. 7 | EX. 8 | EX. 9 | EX. 10 | EX. 11 |
|---|---|---|---|---|---|---|---|---|
| HIGH REFRACTIVE INDEX AND LOW DISPERSION RESIN | THIOL COMPOUND | COMPOUND | a-1 | a-1 | a-1 | a-1 | a-1 | a-1 |
|  |  | PARTS BY MASS | 52 | 52 | 51 | 53 | 53 | 50 |
|  | ISOCYANATE COMPOUND | COMPOUND |  |  | b-6 | b-7 | b-8 | b-6 |
|  |  | PARTS BY MASS |  |  | 1.3 | 1.3 | 1.3 | 1.2 |
|  | ene COMPOUND | COMPOUND | b-1 | b-1 | b-1 | b-1 | b-1 | b-2 |
|  |  | PARTS BY MASS | 48 | 48 | 36 | 34 | 34 | 38 |
|  | POST-CURING REFRACTIVE INDEX ne |  | 1.628 | 1.628 | 1.622 | 1.621 | 1.621 | 1.604 |
|  | ABBE NUMBER vd |  | 39 | 39 | 39 | 39 | 39 | 41 |
|  | VISCOSITY OF COMPOSITION (PRE-CURING)/mPa·s |  | 3000 | 2000 | 2500 | 2500 | 2500 | 4500 |
|  | PHOTOCURABILITY |  | GOOD | GOOD | GOOD | GOOD | GOOD | GOOD |
|  | SH/ene RATIO |  | 1 | 1 | 1 | 1 | 1 | 1 |
| LOW REFRACTIVE INDEX AND HIGH DISPERSION RESIN | POLYMERIZABLE AROMATIC COMPOUND | COMPOUND | b-3 | b-3 | b-3 | b-3 | b-3 | b-3 |
|  |  | PARTS BY MASS | 47 | 47 | 54 | 56 | 55 | 84 |
|  | REFRACTIVE INDEX ADJUSTING COMPONENT | COMPOUND | b-4 | b-4 | b-4 | b-4 | b-4 | b-4 |
|  |  | PARTS BY MASS | 53 | 53 | 46 | 44 | 45 | 16 |
|  | POLYMERIZATION INITIATOR | COMPOUND | i-2 | i-1 | i-2 | i-2 | i-2 | i-2 |
|  |  | PARTS BY MASS | 1 | 1 | 1 | 1 | 1 | 1 |
|  | REFRACTIVE INDEX ne |  | 1.601 | 1.601 | 1.598 | 1.597 | 1.597 | 1.583 |
|  | ABBE NUMBER vd |  | 30 | 30 | 30 | 30 | 30 | 33 |
| REFRACTIVE INDEX DIFFERENCE | Δne |  | 0.027 | 0.027 | 0.024 | 0.024 | 0.024 | 0.021 |
|  | ΔnF/Δne |  | 0.92 | 0.92 | 0.92 | 0.92 | 0.92 | 0.92 |
|  | ΔnC/Δne |  | 1.08 | 1.08 | 1.08 | 1.08 | 1.08 | 1.07 |
| HEIGHT OF DIFFRACTION GRATING/μm |  |  | 21.6 | 21.6 | 24.1 | 24.1 | 24.1 | 28.2 |
| DIFFRACTION EFFICIENCY/% |  |  | 97 | 97 | 97 | 97 | 97 | 97 |
| DIFFRACTION EFFICIENCY GOOD/POOR |  |  | GOOD | GOOD | GOOD | GOOD | GOOD | GOOD |
| BIREFRINGENCE |  |  | GOOD | GOOD | GOOD | GOOD | GOOD | GOOD | a-1: 4-mercaptomethyl-3,6-dithia-1,8-octanedithiol
b-1: triallyl isocyanurate
b-2: pentaerythritoltetraacrylate
b-3: ethoxylated bisphenol A diacrylate
b-4: 9,9-bis(4-(2-acryloxyethoxy)phenyl)fluorene
b-6: isophoronediisocyanate
b-7: 1,6-hexamethylenediisocyanate
b-8: 1,3-bis(isocyanatomethyl)cyclohexane
i-1: 1-hydroxycyclohexyl-phenylketone
i-2: t-butylperoxy-2-ethylhexanoate

TABLE 3

|  |  |  | COMPARATIVE EX. 1 | COMPARATIVE EX. 1 | COMPARATIVE EX. 3 |
|---|---|---|---|---|---|
| HIGH REFRACTIVE INDEX AND LOW DISPERSION RESIN | THIOL COMPOUND | COMPOUND | a-3 | a-3 | a-3 |
|  |  | PARTS BY MASS | 60 | 60 | 30 |
|  | SULFUR COMPOUND | COMPOUND |  |  | a-4 |
|  |  | PARTS BY MASS |  |  | 70 |
|  | ene COMPOUND | COMPOUND | b-1 | b-1 |  |
|  |  | PARTS BY MASS | 40 | 40 |  |
|  | POST-CURING REFRACTIVE INDEX ne |  | 1.567 | 1.567 | 1.666 |
|  | ABBE NUMBER vd |  | 45 | 45 | 38 |
|  | VISCOSITY OF COMPOSITION (PRE-CURING)/mPa·s |  | 470 | 470 | 30 |
|  | PHOTOCURABILITY |  | GOOD | GOOD | POOR |
|  | SH/ENE ratio |  | 1 | 1 | 1 |
| LOW REFRACTIVE INDEX AND HIGH DISPERSION RESIN | POLYMERIZABLE AROMATIC COMPOUND | COMPOUND | b-3 | b-3 | b-10 |
|  |  | PARTS BY MASS | 60 | 36 | 100 |
|  | REFRACTIVE INDEX ADJUSTING COMPONENT | COMPOUND | b-5 | b-5 |  |
|  |  | PARTS BY MASS | 40 | 64 |  |
|  | POLYMERIZATION INITIATOR | COMPOUND | i-2 | i-2 | i-2 |
|  |  | PARTS BY MASS | 1 | 1 | 1 |
|  | REFRACTIVE INDEX ne |  | 1.557 | 1.547 | 1.625 |
|  | ABBE NUMBER vd |  | 40 | 44 | 27 |

TABLE 3-continued

|  | | COMPARATIVE EX. 1 | COMPARATIVE EX. 1 | COMPARATIVE EX. 3 |
|---|---|---|---|---|
| DEFRACTION INDEX DIFFERENCE | Δne | 0.01 (NOT SUITABLE) | 0.02 | 0.041 |
|  | ΔnF/Δne | 0.92 | 1 | 0.93 |
|  | ΔnC/Δne | 1.07 | 1 | 1.07 |
| HEIGHT OF DIFFRACTION GRATING/μM | | 60 (NOT SUITABLE) | 26.3 | 14 |
| DIFFRACTION EFFICIENCY/% | | 95 | 80 | 97 |
| DIFFRACTION EFFICIENCY GOOD/POOR | | GOOD | POOR | GOOD |
| BIREFRINGENCE | | GOOD | GOOD | GOOD | a-3: pentaerythritoltetrakisthiopropionate
a-4: bis(β-epithiopropyl)sulfide
b-1: triallyl isocyanurate
b-3: ethoxylated bisphenol A diacrylate
b-5: tricyclodecanedimethanoldiacrylate
b10: EA-HR03 3
i-2: t-butylperoxy-2-ethylhexanoate

The invention claimed is:

1. A composition for a high refractive index and low dispersion resin for a close-contact double layer-type composite diffractive optical element, the composition comprising:
a thiol compound represented by formula (1) or an oligomer synthesized by use of a thiol compound represented by formula (1) (A component); and
an ene compound including two or more polymerizable unsaturated bonds (B component):

(1)

where p represents an integer of 2 to 5; $X_p$ and $Z_p$ independently represent a hydrogen atom, a mercapto group, or a mercaptomethyl group; a ratio of sulfur atoms in a molecule is 40 to 80% by mass; and the number of thiol groups is 3 or larger.

2. The composition for a high refractive index and low dispersion resin according to claim 1, wherein the thiol compound represented by formula (1) is at least one selected from the group consisting of 4-mercaptomethyl-1,8-dimercapto-3,6-dithiaoctane (4-mercaptomethyl-3,6-dithia-1,8-octanedithiol), 4,8-bis(mercaptomethyl)-1,11-dimercapto-3,6,9-trithiaundecane (4,8-dimercaptomethyl-1,11-dimercapto-3,6,9-trithiaundecane), 4,7-bis(mercaptomethyl)-1,11-dimercapto-3,6,9-trithiaundecane (4,7-dimercaptomethyl-1,11-dimercapto-3,6,9-trithiaundecane), and 5,7-bis(mercaptomethyl)-1,11-dimercapto-3,6,9-trithiaundecane (5,7-dimercaptomethyl-1,11-dimercapto-3,6,9-trithiaundecane).

3. The composition for a high refractive index and low dispersion resin according to claim 1, wherein the component A is an oligomer synthesized by use of the thiol compound represented by formula (1).

4. The composition for a high refractive index and low dispersion resin according to claim 1, wherein the component B is a non-aromatic ene compound.

5. The composition for a high refractive index and low dispersion resin according to claim 1, wherein the composition includes the component A at a ratio of 30% by mass or higher.

6. The composition for a high refractive index and low dispersion resin according to claim 1, wherein the composition has a viscosity at 23° C. in the range of 500 to 20000 mPa·s.

7. The composition for a high refractive index and low dispersion resin according to claim 1, wherein the component A contains an oligomer in which a part of a thiol group in the thiol compound represented by formula (1) is bonded with an isocyanate compound.

8. The composition for a high refractive index and low dispersion resin according to claim 1, wherein the composition has an Abbe number in the range of 30 to 50.

9. A high refractive index and low dispersion resin obtained by curing the composition for a high refractive index and low dispersion resin according to claim 1.

10. A close-contact double layer-type composite diffractive optical element, comprising:
the high refractive index and low dispersion resin according to claim 9; and
a low refractive index and high dispersion resin having a refractive index lower than that of, and exhibiting a dispersibility higher than that of, the high refractive index and low dispersion resin.

11. The close-contact double layer-type composite diffractive optical element according to claim 10, wherein the high refractive index and low dispersion resin and the low refractive index and high dispersion resin have a refractive index difference at an e line of 0.02 to 0.1; have a refractive index difference at an F line that is 0.8 to 0.98 times the refractive index difference at the e line; and have a refractive index difference at a C line that is 1.02 to 1.26 times the refractive index difference at the e line.

12. The composition for a high refractive index and low dispersion resin according to claim 1, wherein the component B comprises triallyl isocyanurate, triallyl cyanurate, tetraallyloxyethane, hydrogenated triallyl trimellitate, oligoethyleneglycoldi(meth)acrylate, dimethyloltricyclodecanedi(meth)acrylate, trimethylolpropanetri(meth)acrylate, pentaerythritoltetra(meth)acrylate, dipentaerythritolhexa(meth)acrylate, or 2,2'-thiodiethanethioldi(meth)acrylate.

13. The composition for a high refractive index and low dispersion resin according to claim 1, wherein the ratio of the B component in the composition for the high refractive index and low dispersion resin is 20 to 70% by mass.

* * * * *